July 25, 1961 M. FELSTEIN 2,993,277
DRAFTING IMPLEMENT FOR PLOTTING SPHERICAL FIGURES
Filed March 21, 1957 6 Sheets-Sheet 1

INVENTOR
MILTON FELSTEIN

July 25, 1961     M. FELSTEIN     2,993,277
DRAFTING IMPLEMENT FOR PLOTTING SPHERICAL FIGURES
Filed March 21, 1957     6 Sheets-Sheet 2

INVENTOR
MILTON FELSTEIN
BY
ATTORNEYS

July 25, 1961 M. FELSTEIN 2,993,277
DRAFTING IMPLEMENT FOR PLOTTING SPHERICAL FIGURES
Filed March 21, 1957 6 Sheets-Sheet 3

INVENTOR
MILTON FELSTEIN

BY

ATTORNEYS

July 25, 1961 M. FELSTEIN 2,993,277
DRAFTING IMPLEMENT FOR PLOTTING SPHERICAL FIGURES
Filed March 21, 1957 6 Sheets-Sheet 5

INVENTOR
MILTON FELSTEIN

July 25, 1961 M. FELSTEIN 2,993,277
DRAFTING IMPLEMENT FOR PLOTTING SPHERICAL FIGURES
Filed March 21, 1957 6 Sheets-Sheet 6
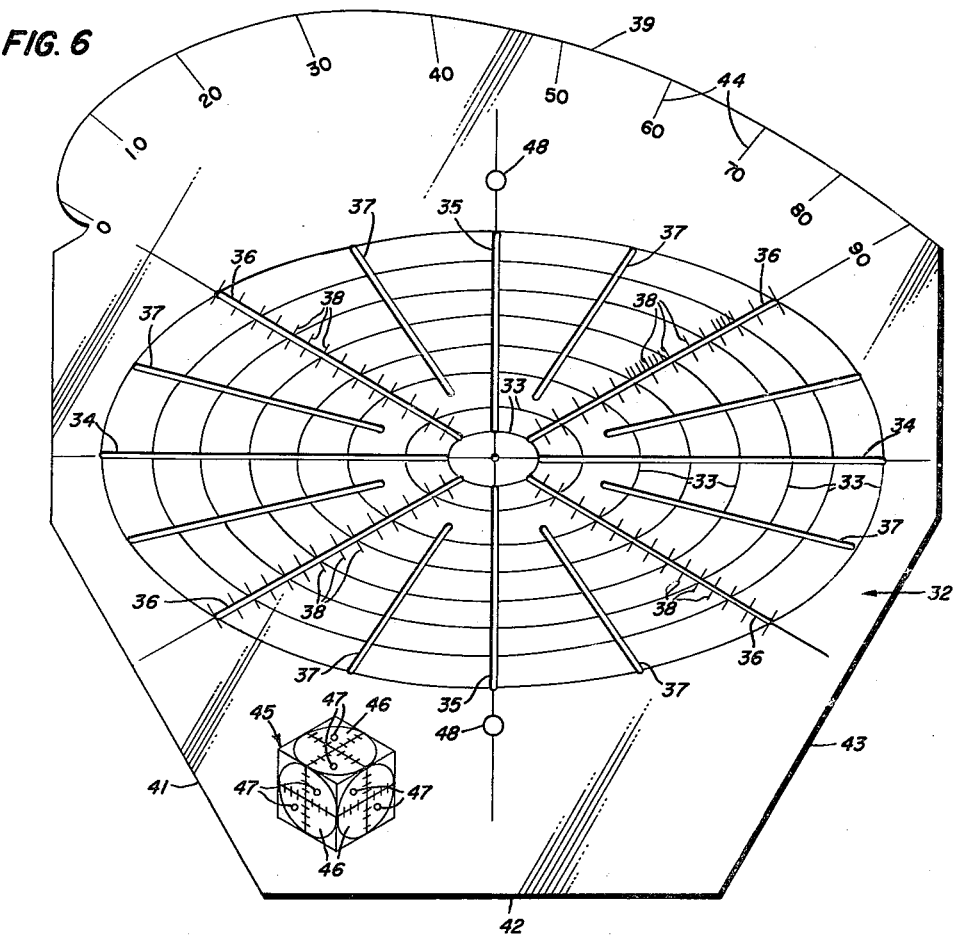
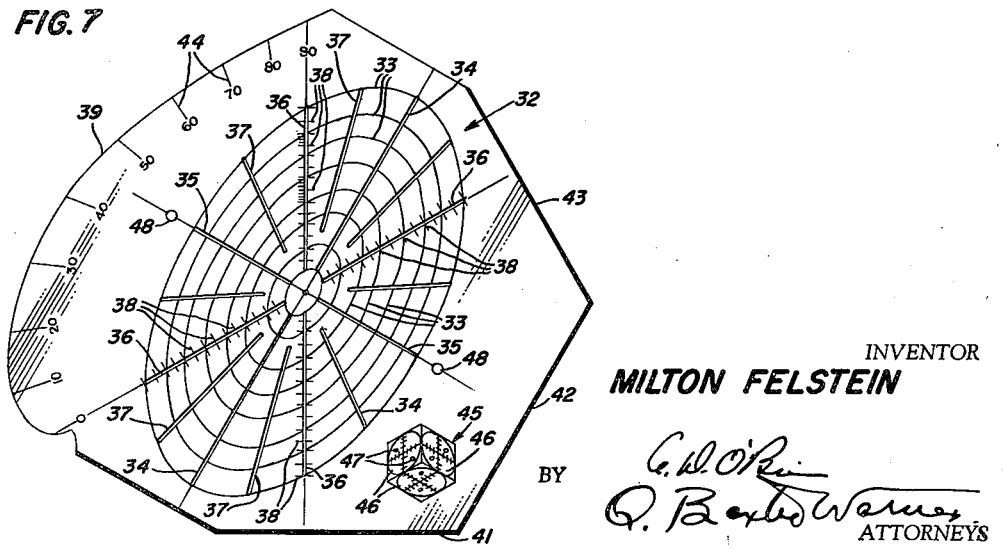
INVENTOR
MILTON FELSTEIN
ATTORNEYS

United States Patent Office 2,993,277
Patented July 25, 1961

2,993,277
DRAFTING IMPLEMENT FOR PLOTTING
SPHERICAL FIGURES
Milton Felstein, 1406 Crittenden St., NW.,
Washington, D.C.
Filed Mar. 21, 1957, Ser. No. 647,734
2 Claims. (Cl. 33—1)
(Granted under Title 35, U.S. Code (1952), sec. 266)

The invention described herein may be manufactured and used by or for the Government of the United States of America for governmental purposes without the payment of any royalties thereon or therefor.

The present application is a continuation-in-part of abandoned application Serial No. 411,598, filed February 19, 1954, for Drafting Implement for Plotting Spherical Figures.

The invention relates to improvements in geometrical instruments and more specifically to improved means for laying out spherical diagrams based on normal axonometric projection.

The pictorial representation of space relationships arising in many branches of science, mathematics, and technology may be conveniently achieved by drawing diagrams that are axonometric projections of a sphere intersected by planes passing through its center.

These spherical diagrams are frequently drawn incorrectly even though they ordinarily deal only with the following two characteristic problems:

*Problem 1.*—Draw an ellipse, given a pair of diameters, conjugate or nonconjugate, the required ellipse representing the great circle intersection of the sphere with the plane determined by the given diameters.

*Problem 2.*—Lay off on an ellipse an arc having a given angular measure on the primitive great circle. An important application of this problem is the determination of the position of one plane relative to another based on the principle that the dihedral angle between two planes intersecting along a given diameter of a sphere is measured by the intercepted arc of the great circle normal to the given diameter.

Standard drafting methods for solving problem 1, given conjugate diameters, are found in T. E. French and C. J. Viercк, Engineering Drawing, McGraw-Hill, New York, N.Y., eighth edition, 1953, pp. 82, 83. The standard drafting method for solving problem 2, is found in J. S. Frame, Solid Geometry, McGraw-Hill, New York, N.Y., 1948, pp. 166, 167, paragraph 22.4. No standard drafting method is available to solve problem 1, given nonconjugate diameters; methods of descriptive geometry are required.

An important object of the invention is to provide improved means for drafting spherical diagrams.

Another important object is the provision of improved means for solving the hereinbefore stated problems 1 and 2.

Another important object is to provide an improved drafting implement for use in laying out spherical diagrams based, for example, on normal axonometric projection.

A further object is the provision of a novel transparent overlay chart displaying a grid of spherical coordinates for use in laying out spherical diagrams of the character described.

A still further object is to provide improved means for graphically solving spherical triangles.

Another object of the invention is the provision of a new and improved device for laying off an ellipse of given obliquity and orientation that will represent a circular section of given diametral value.

Another object of the invention is the provision of a novel instrument having a family of ellipses of given obliquity and an auxiliary figure for indicating the manner in which the instrument may be oriented on the drawing sheet in order to depict circular sections lying in the major planes of a drawing.

Another object of the invention is the provision of a novel device displaying a family of ellipses of given obliquity and a plurality of straight marginal edges whereupon the family of ellipses may be disposed in the desired position to represent circular sections lying in the major planes of a drawing.

Other objects and many of the attendant advantages of this invention will be readily appreciated as the same becomes better understood by reference to the following detailed description when considered in connection with the accompanying drawings wherein:

FIG. 6 is a plan view illustrating an alternate arrangement of the drafting implement of FIGS. 1 and 2; and FIG. 7 is a diagrammatic view illustrating the manner in which the implement of FIG. 6 may be employed for laying out spherical figures.

Figure 1:
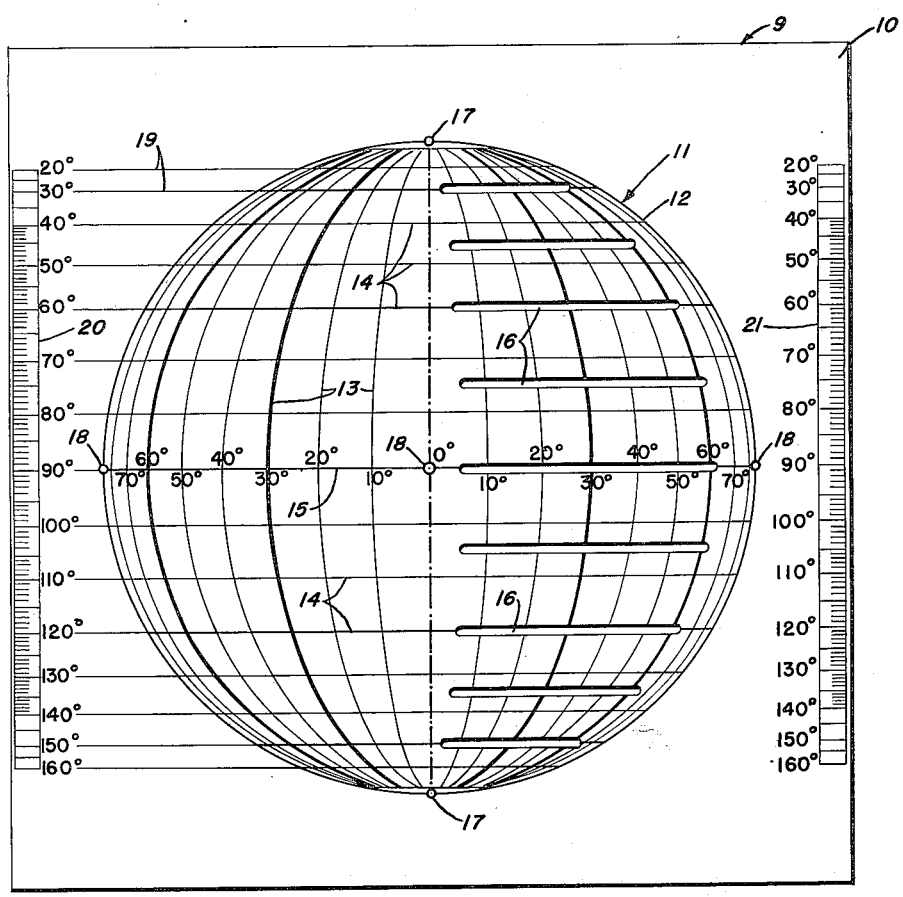
FIGS. 1 and 2 are top plan views, respectively, of preferred and modified forms of the drafting implement.

In FIG. 1 is shown the improved drafting implement 9, formed of a rectangular sheet 10 of stiff but flexible transparent material, such as one-sixteenth inch thick "Lucite."

Delineated on or formed in the sheet 10 is a grid 11 of spherical coordinates in a spherical outline 12 and comprising curved longitude lines 13 representing great circles of the sphere outlined at 12 and straight latitude lines 14 representing small circles of the sphere and an equatorial line 15.

Formed in the sheet at the right side of the grid 11 are spaced parallel through-slots 16 that extend transversely of the right halves of the ellipses described by the longitude lines 13. Also formed in the sheet are pinholes 17 defining the ends of the major axes of the ellipses and other pinholes 18 at the center and at the intersections of the equatorial line 15 with the sphere outline 12.

As more clearly shown on FIG. 1, each of the lines 14 and line 15 are extended beyond the spherical outline 12 as at 19 toward the left-hand edge of the implement 9 and terminate in proximate relation with respect to a scale 20 disposed along the left-hand edge of the sheet 10 and bordering thereon. This scale 20 and a similar scale 21 that extends along and borders on the right-hand edge of the sheet are calibrated in like manner from the top edge to the bottom edge thereof and suitable degree markings are provided therefor, the 90° markings on each scale being centrally disposed thereon. The aforesaid 90° markings on each scale are in alignment with respect to each other and with respect to the equatorial line 15, the other degree markings on each scale and disposed on opposite sides of the 90° markings being in alignment with respect to each other and with their respective and complementary lines 14.

Figure 3:
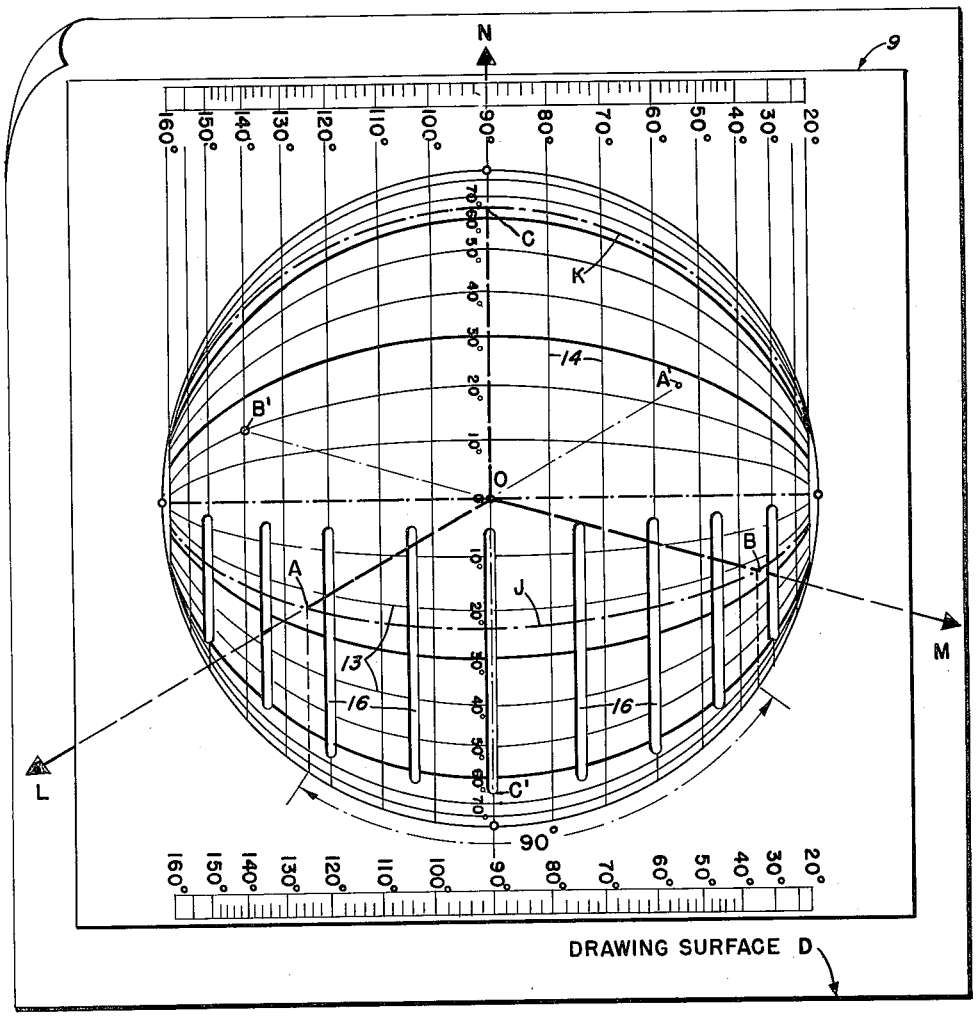
FIGS. 3 through 5 are diagrammatic views illustrating successive steps in laying out spherical diagrams with the aid of the drafting implement.

In using the implement to lay out spherical diagrams, the draftsman ordinarily starts the drawing on drawing surface D with the projection of a unit sphere containing three orthogonal diameters AA', BB', CC' representing three unit coordinate axes, as illustrated in FIG. 3. The axes are disposed in positions most suitable to the purpose of the drawing. The circle representing the sphere is of a diameter equal to the true length of the unit, but the unit axes will be foreshortened on the drawing surface D according to the position taken, different positions giving rise to isometric, dimetric and trimetric projection. FIG. 3 is based on a trimetric scale resulting in unequal foreshortening of all three axes.

Given the directions OL, OM, ON of the unit axes on the drawing, their relative projected lengths may be determined in the following manner. The implement 9 is centered over the intersection O of the three given direction lines OL, OM, ON with its parallels 14 vertical. By observation of the various longitude lines 13 on the implement, an ellipse J is located, exactly or by visual interpolation, whose intersections A, B with the two non-vertical direction lines OL, OM are 90° apart as indicated by the parallels 14. These intersections A, B establish the required unit lengths in these directions. Points along the ellipse J may be established on the drawing surface by marking through the slots 16 with a sharp instrument such as a pencil, and the locations on the drawing surface, of the intersections A, B may be derived from the thus established points by drawing the ellipse, or the lengths OA and OB as observed on the implement may be stepped off on the drawing surface as by the use of dividers. In the example shown, the ellipse J is the 23° ellipse which, even though not delineated on the implement 9, may be determined by visual interpolation. The point establishing the unit length in the vertical direction is the intersection C of the vertical direction line ON with the ellipse K on the implement whose degree reading is the complement of the 23° ellipse J, that is, the 67° ellipse. Now from an inspection of FIG. 4, wherein the implement 9 is shown rotated relative to the drawing surface D, it will be seen that the established points A, C, A', C' determine an ellipse representing the great-circle intersection of the coordinate plane A, C, A', C' with the unit sphere. In the example shown, this ellipse A, C, A', C' is the 31° ellipse which, even though not delineated on the implement 9, may be determined by interpolation. Points along this 31° ellipse may be established on the drawing surface by marking through the slots 16 with a pencil. While two ellipses A, C, A', C' are geometrically possible, only that one having its flattened sides facing the obtuse angles formed by the conjugate diameters is admissible. It will also be noted in FIG. 4 that the minor axis of the ellipse A, C, A', C', lying along the equatorial line on the implement grid, lies in the direction of the coordinate axis B, B', thus representing perpendicularity in space relative to the primitive of the ellipse. It will furthermore be noted that the 31° obliquity of the plane of the primitive of the ellipse can be read directly from the indicia on the implement. The implement will work equally well in the drafting of ellipses established by nonconjugate diameters, one such ellipse A, G, A', G' being shown in FIG. 5.

Let it now be required to draw an ellipse representing a great circle at a dihedral angle of 50° relative to the great circle represented by the ellipse A, B, A', B'. The required ellipse will be determined by the conjugate diameters BB', SS', where SS' makes a 50° angle in space with AA'. Lines SS' and AA' represent diameters of a great circle A, C, A', C' perpendicular in space to the given line of intersection BB' of the two great circles involved. Inherent in the above task is the second characteristic problem encountered in drawing spherical diagrams, in the typical form: Given the ellipse A, C, A', C', lay off an arc AS representing 50° on the primitive great circle. The angular measure between projectors like AL and RS is readily available from the graduations 20, 21 adjacent the sphere outline on the implement. By using the parallels 14 as projectors, in the manner illustrated in FIG. 4, the required 50° arc on the ellipse is then established from the graduated sphere outline. Now, having determined the diameter SS', to complete the given task, it is only necessary to draw the ellipse S, B, S', B' using the method hereinbefore described. This ellipse may be seen in FIG. 5.

Figure 4:
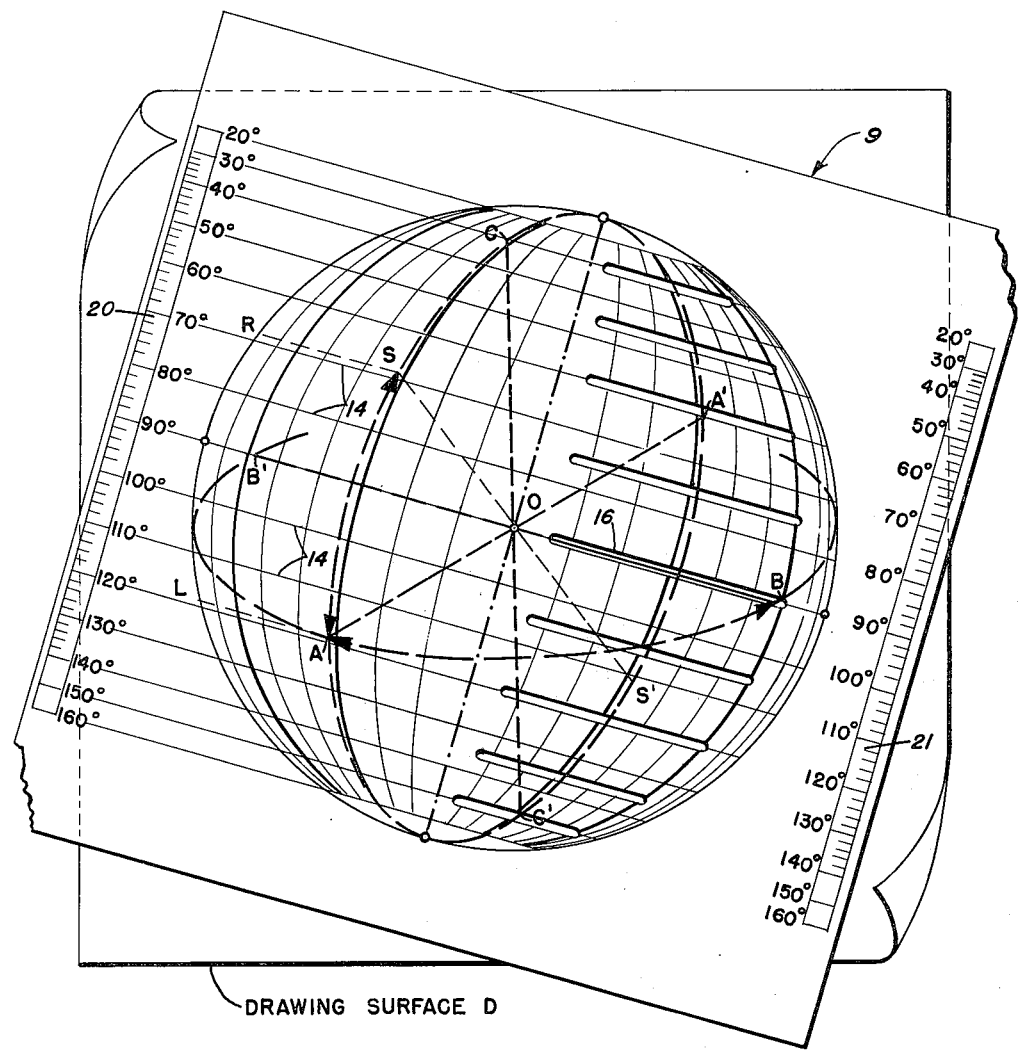
Figure 5:
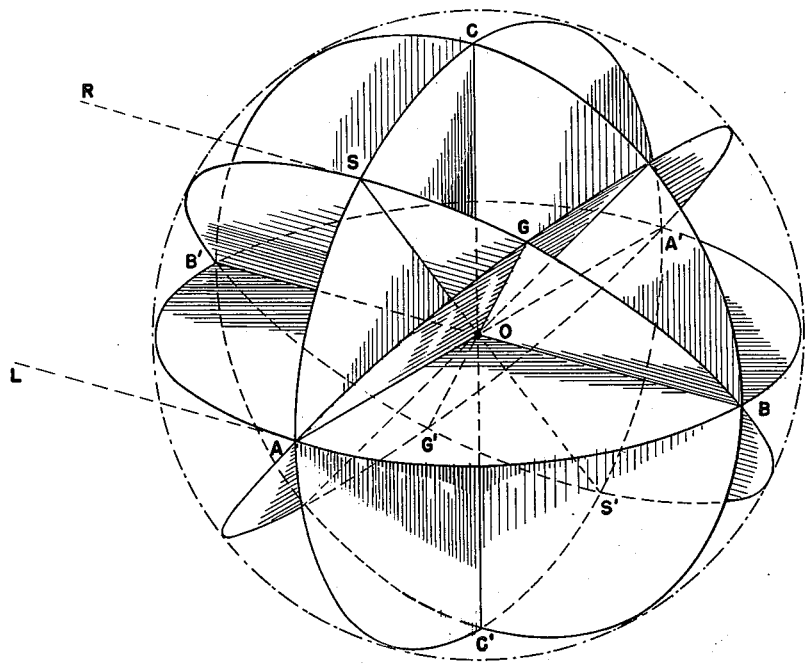

The through-slots 16 and the pinholes 17 at the ends of the common major axis of the ellipse afford access to the drawing surface for pointing off required ellipses on the drawing, to be later finished with a French curve. The slots 16 permit all interpolated ellipses to be pointed off. One side of the implement chart is left clear of slots, for finding solutions. An alternative method of laying off 90° angles, such as angle AOB in a given ellipse A, B, A', B' in FIG. 4, is facilitated by providing one of the through-slots 16 along the equatorial line. In FIG. 4 there is already represented a diameter CC' perpendicular in space to the primitive of the given ellipse and therefore perpendicular to the given diameter AA' containing the initial point A of the desired right angle AOB. The implement is rotated over the drawing surface until some one ellipse A, C, A', C' of the grid passes through all end-points of the two orthogonal diameters AA', CC'. Thus positioned, the equatorial line of the grid, being perpendicular in space to each of these diameters, intersects the ellipse A, B, A', B' at the required point B, and the through-slot along the equatorial line permits access to the drawing surface below the implement and furnishes a guide for drawing the straight line OB.

Figure 2:
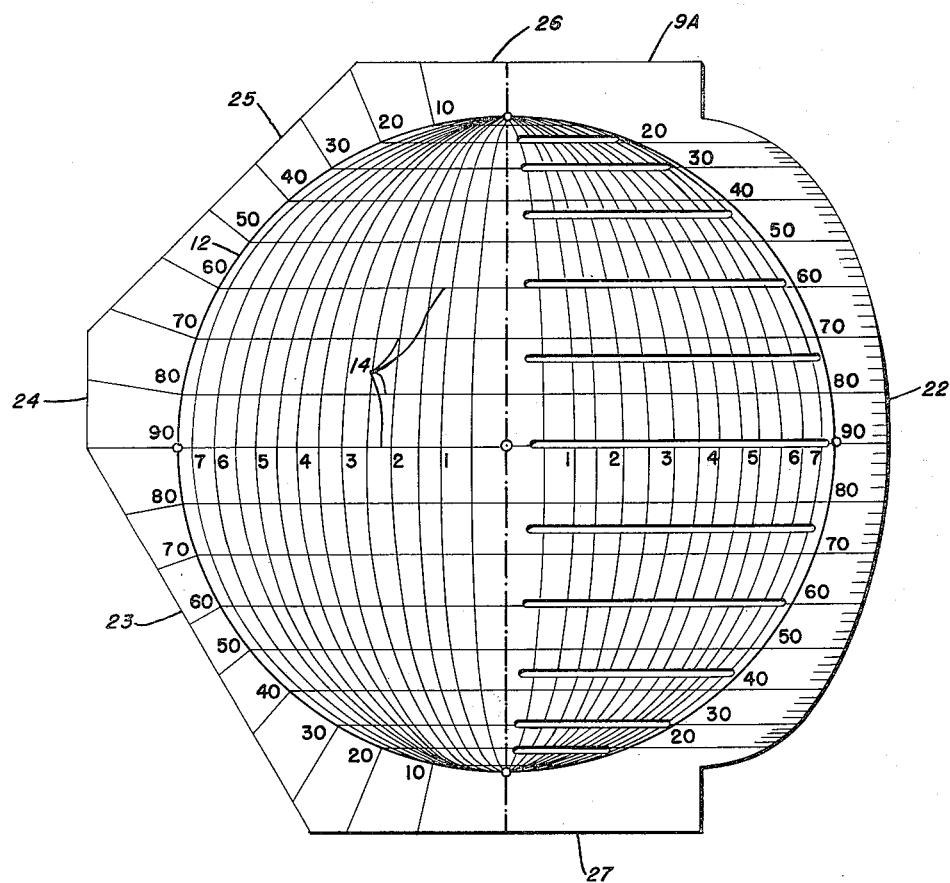

In FIG. 2 is shown a generally similar drafting implement 9A which differs from the previously described device 9 in that its latitude lines 14 are brought out to the right edge 22 of the sheet which is curved to correspond to the curvature of one half of a complete 35° 16' ellipse to form a guide for drawing the often required isometric ellipse. At the left side of the sheet, the aforesaid lines 14 terminate at the spherical outline 12 and the implement 9A is provided with straight edges 23—25 respectively disposed at 60°, 90° and 45° to the direction of the latitude lines 14 and to the parallel upper and lower edges 26, 27 of the implement. The margin along edges 23—25 may be marked for use as a protractor.

Referring to the device of FIGS. 6 and 7, this device is particularly adapted for laying out and drawing one or several ellipses of a family of ellipses having a given obliquity and various values of major diameter. This problem arises in axonometric drawing wherein ellipses of given obliquity are used to represent circular sections of pipes, cylindrical openings, shafts and the like which lie in the major planes of the object being drawn. In isometric drawing, one obliquity 35°16' serves for all three major planes, in diametric drawing, two different obliquities having values depending on the particular system are required, and in trimetric drawing, three are required. It will be seen by reference to FIG. 6 that the instrument disclosed and exhibiting the 35°16' ellipses offers the most profitable application and solutions of such problems.

The problem of laying out ellipses representing circular sections in the major planes involves, orienting the ellipse such that its major diameter is in the proper position as required by the theory of projection, selecting the required size of ellipse either as established by points through which it must pass or by a given size of primitive circle, in order to satisfy the requirements of the drawing, and marking of a sufficient number of points on the ellipse such that it may be drawn by means of a "French" curve, ellipsograph, or other suitable means. It is well known that certain spiral curves can be produced in such a manner that different portions thereof closely approximate one quarter the periphery of ellipses (of a given obliquity) having different diameters. In the arrangement of FIG. 6, the instrument is provided with the specific curve along one edge thereof such that one quarter of the desired ellipse can be drawn using the aforesaid edge as a guide when the major and minor diameters of the ellipse have been plotted.

The instrument of FIGS. 6 and 7 comprises a thin base or sheet 32 composed of any material suitable for the purpose such, for example, as transparent plastic and having inscribed on its lower surface to avoid visual parallax, a family of nested isometric ellipses 33 of various sizes, each ellipse having a common center and major axis. The interval of each consecutive ellipse is such that it represents a given interval on the primitive circle, such, for example, as ¼ inch. The sheet or base is provided with a plurality of slots extending therethrough and traversing each of the aforesaid ellipses, these slots being indicated by the reference characters 34, 35, 36 and 37. It will be noted, FIG. 6, that slots 34 are disposed along the common major diameter of the ellipses, slots 35 are disposed along the minor diameter of the ellipses, slots 36 being disposed between slots 34—35 and positioned 90° apart with one slot 37 disposed between slots 34—36 and 36—35. Each of the slots 36 are provided with suitable calibrations 38 such that ellipses of a desired size may be plotted and produced.

The sheet or base member 32 is provided along the marginal edges thereof with a spiral curve 39, a plurality of straight edges 41, 42 and 43 and degree scale 44. The base member is further provided with a key or reference figure, delineated thereon in the form of a cube 45, drawn in the applicable trimetric system with ellipses 46 representing circular sections lying in its major planes. During the plotting of a desired ellipse this figure is referred to by the draftsman so that the correct orientation of the ellipse on the drawing sheet may be determined. Moreover, to further assist the draftsman in referring the family of ellipses on the sheet 32 with the reference key or cube 45, during the plotting of a proper isometric ellipse, a pair of mutually spaced dots or reference elements 47 are provided within each of the ellipses 46 of key 45 and adapted to cooperate with complementary dots or reference elements 48 positioned on the minor diameters of the family of ellipses and disposed beyond the outermost of largest ellipse of the family of ellipses. The aforesaid three straight edges 41, 42 and 43 on the base member are disposed at an angle with respect to the ellipses 33 such that when the family of ellipses is approximately positioned for the particular and desired plane, such, for example as shown on FIG. 7, and with the edge of the instrument 41 in engagement with a "T-square" or the like (not shown), the ellipses will be in a correct position whereupon an isometric ellipse representing a circle lying in one of the major planes of the aforesaid cube may be plotted on the drafting paper by inserting a scriber into the aforesaid slots and scribing reference marks on the paper at the desired points. It will be understood, that, the ellipse may be drawn by a suitable curve such, for example as a "French" curve, when the curve is positioned in such a manner as to register with and traverse the aforesaid reference points. The spiral curve 39, has the particular shape applicable to the obliquity of the ellipse plotted and will approximately fit and traverse the points defining ¼ of the ellipse with one setting regardless of the size of the ellipse plotted on the paper.

Slots 36 and 37 may be omitted from sheet 32, if desired, only the slots along the major and minor axes of the family of ellipses being retained therein. By this arrangement the reference points of the desired ellipse may be marked through the aforesaid slots and thus due to this specific construction and arrangement of the curve 39 a true isometric ellipse may be drawn.

It will be noted, FIG. 6, that the aforesaid scale 44 is disposed radially with respect to the center of the family of ellipses 33 and spaced in such a manner that angular values along the peripheries of ellipses having the obliquity of the instrument, may be laid off. This may be accomplished by placing the instrument centrally over a given ellipse and orienting it so that one ellipse, interpolated if necessary, coincides with the given ellipse. Marking, a point of intersection of the graduated margin or scale 44 with a line drawn from the center of the given ellipse to a point on this ellipse from which the angular measurement is to be laid off, which line will intersect the scale at the aforesaid point of intersection corresponding to one of the degree markings on the aforesaid scale, thereafter it will only be necessary to count off the desired angular measure along the scale and mark another reference points and thus a line connecting this point with the center of the given ellipse will intersect the ellipse at the desired point.

Obviously many modifications and variations of the present invention are possible in the light of the above teachings. It is therefore to be understood that within the scope of the appended claims the invention may be practiced otherwise than as specifically described.

What is claimed is:

1. A unitary drafting implement for plotting ellipses on paper in connection with isometric figures and comprising a sheet composed of transparent material, a plurality of mutually spaced curved lines on said sheet and simulating a plurality of ellipses in spaced relationship and of various sizes, a plurality of slots in said sheet and intersecting said curved lines and corresponding to the major, minor and intermediate diameters of ellipses to be plotted on the paper in accordance with the isometric figures, said curved lines terminating at said slots and providing a plurality of mutually spaced reference points throughout the length of the slots and cooperating therewith for plotting said ellipses of various sizes in accordance with said isometric figures by marking the paper at preselected reference points along said major, minor and intermediate diameters, a pair of mutually spaced reference elements on said sheet and disposed on said minor diameter, a trimetric reference key on the sheet and having reference means cooperating with said reference elements on said minor diameter for positioning the implement on the paper in proper relationship with respect to isometric figures during the plotting operation, a plurality of guide edges on the sheet for maintaining the implement in proper position with respect to the isometric figures during said plotting operation, and a curved edge on the sheet for developing ellipses of various sizes in accordance with said preselected reference points.

2. A unitary drafting implement for plotting and developing on paper ellipses in accordance with isometric drawings and comprising a sheet composed of transparent material, a plurality of mutually spaced curved lines on said sheet and simulating a plurality of ellipses of various sizes, a plurality of slots in said sheet intersecting said curved line and corresponding to the major, minor and intermediate diameters of the ellipses to be plotted on the paper, said curved lines providing a plurality of mutually spaced plotting points throughout the length of the said slots and along said major, minor and intermediate diameters for plotting said ellipses of various sizes, a plurality of mutually spaced reference elements provided on said sheet and disposed on said minor diameter, trimetric reference means on said sheet, a plurality of key ellipses on said reference means, mutually spaced reference points on said key ellipses and cooperating with said reference elements disposed on said minor diameter for positioning the implement in proper relationship with respect to an isometric drawing during the plotting of the ellipses of various sizes, means on the implement for maintaining the implement in said proper relationship during the plotting operation, and means on the implement for developing preselected plotting points along the major, minor and intermediate diameters into ellipses of various sizes after completion of plotting operation.

References Cited in the file of this patent

UNITED STATES PATENTS

| | | |
|---|---|---|
| D. 141,882 | Matson | July 31, 1945 |
| 759,935 | Swenson | May 17, 1904 |
| 1,132,272 | Jacobs | Mar. 16, 1915 |
| 1,301,092 | Bernard | Apr. 22, 1919 |
| 2,010,198 | Rice | Aug. 6, 1935 |

(Other references on following page)

UNITED STATES PATENTS

| | | |
|---|---|---|
| 2,142,765 | Shattow | Jan. 3, 1939 |
| 2,552,215 | Rekdahl | May 8, 1951 |
| 2,713,205 | Nielsen | July 19, 1955 |

FOREIGN PATENTS

| | | |
|---|---|---|
| 14,008 | Great Britain | 1908 |
| 156,033 | Great Britain | Jan. 6, 1921 |
| 379,984 | Germany | Sept. 1, 1923 |
| 205,572 | Switzerland | Sept. 16, 1939 |
| 500,063 | Great Britain | Feb. 2, 1939 |
| 568,769 | Great Britain | Apr. 19, 1945 |
| 595,537 | Great Britain | Dec. 8, 1947 |
| 609,647 | Great Britain | Oct. 5, 1948 |

OTHER REFERENCES

"Photography Simplifies Trimetric Drawing Technique," an article by W. G. Wilkinson and H. C. Bartholomew in Aero Digest, July 1, 1944, pages 80, 81, 132 and 134.